United States Patent [19]
Rodach

[11] 3,782,234
[45] Jan. 1, 1974

[54] GRIPPING SHAFT

[75] Inventor: Alexander Rodach, Pforzheim, Germany

[73] Assignee: Frau Irma Ungerer, Pforzheim, Germany

[22] Filed: Dec. 3, 1971

[21] Appl. No.: 204,602

[30] Foreign Application Priority Data
May 27, 1971 Germany............... P 21 26 407.3

[52] U.S. Cl. .................... 83/665, 83/501, 83/698
[51] Int. Cl. ............................................ B26d 1/12
[58] Field of Search ............... 83/665, 698, 501, 83/499, 498, 482

[56] References Cited
UNITED STATES PATENTS
| | | | |
|---|---|---|---|
| 2,801,694 | 8/1957 | Schneider et al. | 83/698 X |
| 3,173,325 | 3/1965 | Warren et al. | 83/501 X |
| 3,422,714 | 1/1969 | Van Gompel et al. | 83/504 X |
| 3,073,198 | 1/1963 | Clem | 83/665 X |

FOREIGN PATENTS OR APPLICATIONS
| | | |
|---|---|---|
| 1,038,902 | 9/1958 | Germany |
| 870,927 | 6/1961 | Great Britain ............ 83/665 |

*Primary Examiner*—Andrew R. Juhasz
*Assistant Examiner*—W. Donald Bray
*Attorney*—George F. Dvorak et al.

[57] ABSTRACT

A clamping shaft for clamping a rotating element comprises a generally closed tubular core having an inlet adapted to be connected to a pressure fluid source, and radial bore means communicating with said inlet and open on the outside peripheral surface of said core. The shaft also comprises an expansible clamping sleeve enclosing the outside peripheral surface of said core and firmly and tightly joined thereto at least at two spaced-apart portions of its length to define around said core at least one annular space, which communicates with said radial bore means.

5 Claims, 4 Drawing Figures

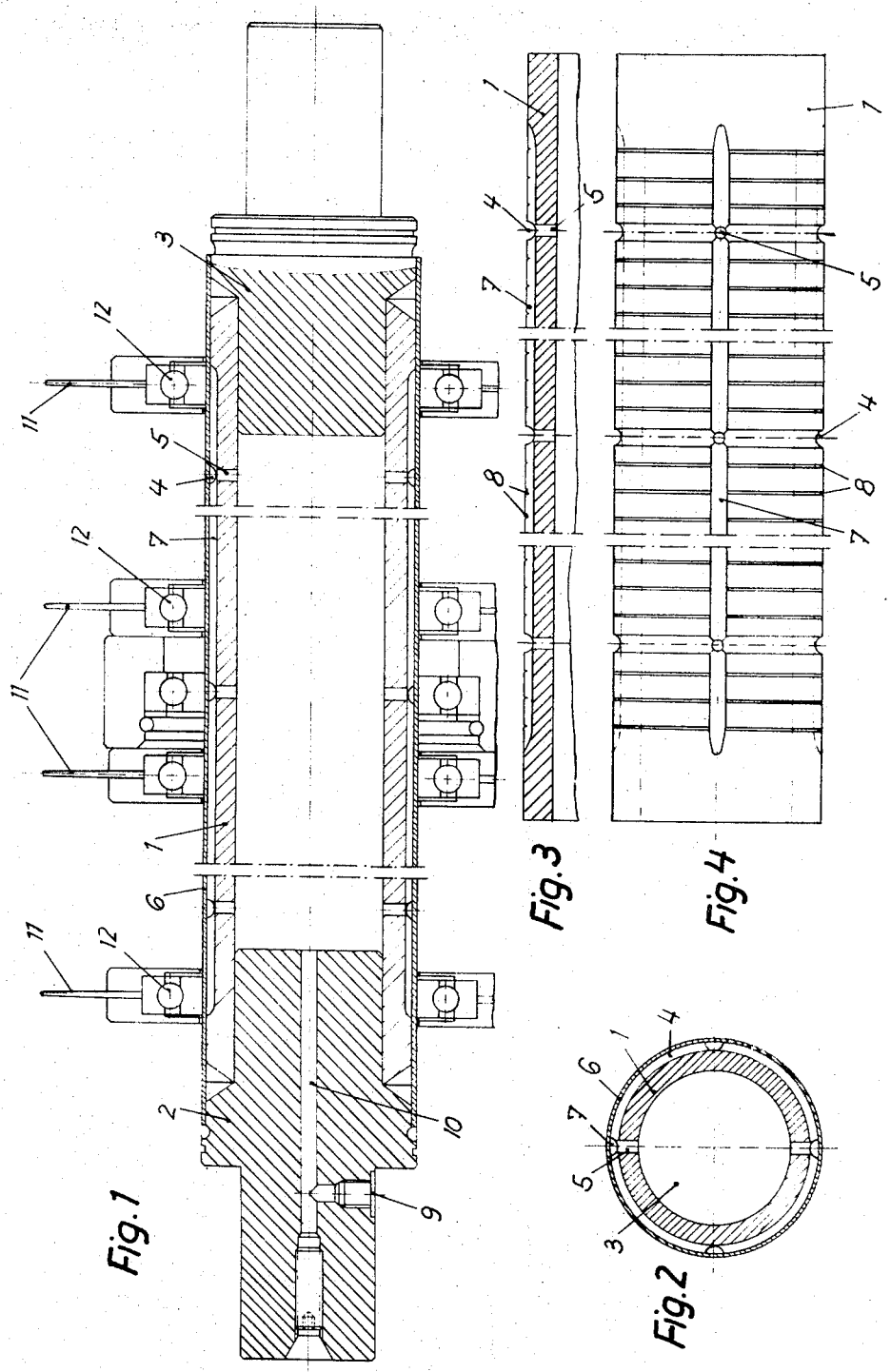

GRIPPING SHAFT

This invention relates to a clamping shaft for rotating tools and guides, particularly for use in strip-slitting and -cutting plants.

In strip-slitting and -cutting plants, the tools for cutting the strip and the guides for guiding the resulting partial strips must be mounted on holders, which are adjustable to desired lines of cut. In the conventional practice, hollow shafts are used for this purpose, and these shafts are formed with offset slots, which are spaced around the periphery of the shaft and are closed by mating pads, which are forced from the inside against the mounted tools or guides to clamp the same. When it is desired to adjust the tools and guides, the clamping pads must be released and the parts must be shifted and are thereafter re-clamped. This adjustment is complicated and inaccurate and the parts are not always reliably held.

It is also known to mount rotary cutting tools on a clamping shaft which consists of a closed hollow shaft having an inlet bore for connection to a pressure fluid source and with radial bores for applying clamping forces. The tools are applied to such shaft and sealed thereto with special sealing means. The tools are adjusted so that gripping chambers of the tools are aligned with the radial bores so that the tools are clamped by the application of pressure thereto. In this case, expensive special tools are required, which have clamping chambers and must be individually sealed. Besides, the tools can be adjusted only within a limited range, which is insufficient for the cutting and guiding of the strip in a flexible operation of a strip-slitting and -cutting plant.

The invention provides a clamping shaft for rotating tools and guides, particularly for use in strip-slitting and -cutting plants having a hollow shaft of the kind mentioned above. This clamping shaft comprises a surrounding clamping sleeve, which may consist of metal and is firmly and tightly joined to a tubular shaft core at least at both ends and is adapted to be subjected to the action of a pressure fluid, such as oil, and to expand under the action of such pressure so as to hold tools or guides mounted on said shaft in the desired position. This design eliminates the need for special sealing means and for the use of special tools. Besides, the tools and guides may be adjusted as desired and can be clamped satisfactorily on the clamping sleeve when the same is subjected to oil pressure. When the clamping sleeve has been relieved of pressure, the tools and guides may be shifted to new adjusted positions. The tools or guides, such as parting discs or parting pressure rollers, such as are used in trimming and slitting plants, may be mounted on ball bearings having an inner race, which is slidable on the clamping sleeve and which can be clamped thereon.

The tubular core may be formed on its outside peripheral surfaces with grooves, which preferably extend in the longitudinal and circumferential directions of the core and define lands, which are fluted whereas the clamping sleeve fixed to the core is smooth and ensures a tight seal. The flutes in the lands reliably prevent a formation of oil bubbles when the sleeve is relieved of pressure to permit of an adjustment of the tools or guides because the pressure of the oil drops quickly and uniformly.

An embodiment of a clamping shaft according to the invention is shown by way of example on the drawing, in which:

FIGS. 1 and 2 are, respectively, longitudinal and transverse sectional views showing a clamping shaft according to the invention, and FIGS. 3 and 4 are, respectively, a fragmentary sectional view and a top plan view showing on an enlarged scale the tubular shaft core without the clamping sleeve.

It is apparent from FIGS. 1 and 2 of the drawing that the clamping shaft comprises a tubular core 1, which is closed at both ends 2 and 3 and is formed with radial bores 5, which open into grooves 4 on the outside of the core. The tubular core is surrounded by a clamping sleeve 6. The circumferential grooves 4 which define annular recesses on the outside peripheral surface of the tubular core 1 are crossed by longitudinal grooves 7. The lands defined by the grooves 4 and 7 are divided by flutes 8. The clamping sleeve ensures a reliable seal on the outside.

The pressure fluid (pressure oil) flows through the supply conduits 9, 10 into the tubular core 1 and through the radial bores 5 to the inside surface of the clamping sleeve 6 so that the tools or guides 11 fitted on the sleeve 6 are clamped in the desired positions. The crossing circumferential and longitudinal grooves 4 and 7 ensure a reliable draining of the pressure fluid (oil) when the shaft is relieved of pressure to permit of an adjustment of the tools.

The tools or guides 11 may consist mainly of slitting discs or parting pressure rollers, such as are used in strip-trimming and -slitting plants. These discs or rollers must be adjusted to the desired width of the strip. The tools or guides 11 are rotatably mounted on ball bearings 12, which have an inner race that is slidably mounted on the clamping sleeve 6 and can be clamped in position thereon.

What is claimed is:

1. A clamping shaft for clamping a rotatable element therearound comprising a closed tubular core provided with an inlet communicating with a source of fluid pressure, the outer surface of said core having at least one annular recess between the ends thereof, said core also having a plurality of passages extending radially from the inside to the at least one annular recess of said tubular core, and an expansible clamping sleeve surrounding said tubular core and being firmly and tightly secured to at least two axially spaced unrecessed portions of said core to enclose said at least one recess on the outer surface of said core to form therewith at least one closed, annular space, whereby when fluid pressure is introduced into said tubular core and into said annular space through said radial passages, said expansible sleeve will expand sufficiently to clamp the rotatable element in a desired, fixed position on said tubular core.

2. A clamping shaft as claimed in claim 1 wherein said clamping sleeve consists of a metal.

3. A clamping shaft as claimed in claim 1 wherein the outer surface of said closed tubular core is provided with at least one longitudinal recess communicating with the at least one annular recess.

4. A clamping shaft as claimed in claim 3 wherein at least one of said radial passages communicates with a point of intersection of the at least one annular recess and the at least one longitudinal recess.

5. A clamping shaft as claimed in claim 3 wherein the outer surface of said closed tubular core is provided with annular flutes parallel to and spaced from said at least one annular recess and communicating with the at least one longitudinal recess.

\* \* \* \* \*